United States Patent [19]

Middleton

[11] 3,752,103

[45] Aug. 14, 1973

[54] CONTROL SYSTEM FOR SUBMERSIBLES TO MINIMIZE BOTTOM SEDIMENT DISTURBANCES

[75] Inventor: William A. Middleton, Bremerton, Wash.

[73] Assignee: The United States of America as represented by the Secretary of the Navy, Washington, D.C.

[22] Filed: Jan. 24, 1972

[21] Appl. No.: 220,025

[52] U.S. Cl.............................................. 114/16 R
[51] Int. Cl................................................ B63g 8/16
[58] Field of Search............... 114/16 R, 16 F, 16 E; 61/69

[56] References Cited
UNITED STATES PATENTS

| | | | |
|---|---|---|---|
| 2,143,656 | 1/1939 | Hojnowski | 114/16 F |
| 3,613,615 | 10/1971 | Sturm et al. | 114/16 R |
| 3,125,976 | 3/1964 | Birmingham | 114/16 F |
| 3,521,589 | 7/1970 | Kemp | 114/16 R |
| 1,541,186 | 6/1925 | Ries | 114/16 R |

*Primary Examiner*—Milton Buchler
*Assistant Examiner*—Galen L. Barefoot
*Attorney*—Richard S. Sciascia et al.

[57] ABSTRACT

A steerable propulsion system for maneuvering a submarine vehicle in close proximity to the bottom of a body of water with minimal disturbance of the bottom material includes a series of four thrust producers spaced about the center of buoyancy of the submarine vehicle. Controls limit the direction of thrust application to prevent the water flow produced by the thrust producers from impinging upon the bottom.

5 Claims, 4 Drawing Figures

PATENTED AUG 14 1973　　　　　　　　　　　　　　　3,752,103

3,752,103

CONTROL SYSTEM FOR SUBMERSIBLES TO MINIMIZE BOTTOM SEDIMENT DISTURBANCES

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of the control of submarine vehicles. More particularly, this invention pertains to the control of submarine vehicles in close proximity to the bottom of the ocean. In still greater particularity, this invention pertains to the control of submarine vehicles in close proximity to the bottom of the ocean through all degrees of freedom of movement without directing water currents on the bottom so as to distrub the sediment lying thereon. In greater particularity, this invention pertains to the control of four thrust producing devices located in spaced relation about the center of buoyancy of such submarine vehicle and controls therefor to prevent water currents created thereby from impinging the bottom of the ocean.

DESCRIPTION OF THE PRIOR ART

A typical undersea near-bottom research vehicle is controlled by the use of thrust vectoring. This control method employs utilization of thrusting devices directed to produce an upward thrusting force. While producing satisfactory vehicle control, the downward backwash from this thrust introduces a severe distrubance of the sediment material on the ocean floor. Because of the reduced gravity, in many cases this sediment material is of such a small particle size that a near colloidal suspension results. As a consequence, the visibility of the water immediately surrounding the vehicle is reduced, sometimes to zero, and this reduction may last for a considerable time, often for days. Additionally, this disturbance of the bottom material creates an environmental disturbance effecting the small marine plant and animal life which is sometimes studied and observed by these vehicles. In instances where the vehicle must return to the same area over an extended period of time, this disruption of animal and plant life on the bottom negates or severely hampers the research effort for which the vehicle is being employed. As a consequence, much of the prior art research of this type has been performed with stationary, underwater habitats located on the ocean floor or an observation platform lowered from the surface but held above the bottom.

SUMMARY OF THE INVENTION

This invention pertains to a method and means for the control of a submarine vehicle in close proximity to the ocean bottom without disturbing the bottom sediment. The invention employs four thrust producing means located in pairs on either side of said vehicle and in spaced relation to the center of buoyancy. Control means are provided in cooperation with said thrust producing means to limit the backwash therefrom to the upper 180° relative to the center plane of said vehicle, containing the thrust producing means.

STATEMENTS OF THE OBJECTS OF THE INVENTION

It is an object of this invention to provide an improved control system for submarine vehicles.

Another object of this invention is to provide an attitude control system for submarine vehicles operating near the floor of the ocean which will not disturb the sediment lying thereon.

Another object of the invention is to control the attitude of a submarine vehicle by directing thrust producing means located symmetrically about the center of buoyancy of said vehicle.

Another object of the invention is to provide control means for thrust producing means used in underwater applications to prevent the backwash from said thrust producing means from impinging upon the bottom of the body of water in which they operate.

These and other objects of the invention will become more readily apparent from the ensuing specification when taken with the drawings.

DESCRIPTION OF THE PREFERRED EMBODIMENT

Figure 1:
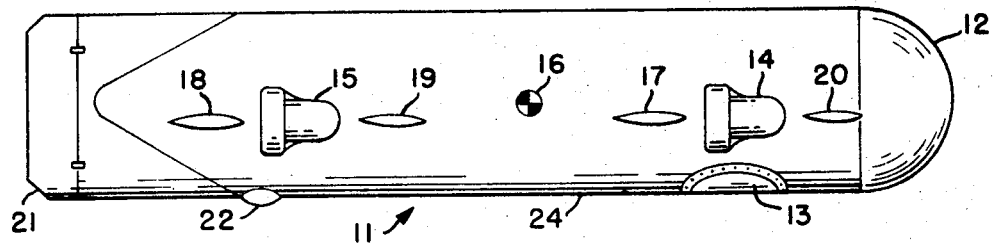
FIG. 1 is a side elevation view of submarine vehicle according to the invention.

Referring to FIG. 1, a submarine vehicle 11 according to the invention is shown in side elevation. Submarine vehicle 11 has a glass or other transparent material viewing dome 12 located at the forward portion thereof. A second viewing port 13 is shown on the lower surface of submarine vehicle 11. It should be understood, of course, that other optical ports may be provided for the vehicle as needed for its research function. Vehicle 11 is propelled by a pair of forward propulsion pods, one shown at 14, and a pair of aft propulsion pods, one shown at 15. For purposes of clearity, only the port propulsion pods 14 and 15 are shown but it should be understood that each has a similar pod located in the same position on the starboard side of submarine vehicle 11 for cooperative association therewith.

It will be observed that propulsion pods 14 and 15 are located symmetrically with respect to the center of buoyancy on submarine vessel 11, as indicated by the standard symbol shown at 16, so as to lie in a common plane, termed the plane of the vehicle. Although the symmetrical location is used in the developmental model, other arrangements are possible, if dictated by other considerations of vehicle design.

Propulsion pods 14 and 15 may be any known state-of-the-art device of the appropriate type. For example, electrically driven screws may provide the propelling thrust, or hydrojet assemblies may be used in lieu thereof. For moving in the aft direction, propulsion pod 14 and 15 may be electrically reversed or may be physically reversed so as to face the opposite direction from that shown in FIG. 1. Directly aft of each propulsion pod 14 and 15 are control fins 17 and 18 respectively.

Control fins 17 and 18 are pivotable so as to direct the thrust of propulsion pods 14 and 15 in an upward direction. The pivoting motion is such that the leading edge thereof is depressed and the plane of the fins intersects the thrust producing backwash from propulsion pods 14 and 15. The angular degree of freedom of movement of control fins 17 and 18 which are the forward and aft fins respectively need by only 90° at the maximum. In actual applications, a much smaller degree of freedom of movement may be utilized and fins having a freedom of movement of only 45° will prove satisfactory in most applications.

Control fins 19 and 20 are positioned in front of propulsion pods 15 and 14 respectively. During forward movement of vehicle 11, fins 19 and 20 remain in their illustrated horizontal position. However, for rearward movement of vehicle 11, which may be produced by reversing the direction of the propulsive motor pods 14 and 15 physically or hydrodynamically, fins 19 and 20 provide the control functions associated with fins 17 and 18 for forward movement. When fins 19 and 20 are operational during the aft movement, fins 17 and 18 remain in their illustrated horizontal position. Of course, during control functions the physical movements of fins 19 and 20 are opposite in direction to control fins 17 and 18. That is, the aft edge of fins 19 and 20 are depressed to the same angular movement as the forward edge of fins 17 and 18 to produce upward deflections of the thrusting propwash.

The illustrated configuration using fixed propulsion pods 14 and 20 and movable control surfaces 17, 18, 19, and 20 may be used for a larger vehicle such as manned submarine observation vehicles. However, if desired, fins 17, 18, 19, and 20 may be omitted and propulsion pods 14 and 15 turned about their mounting so as to direct their entire thrust in the desired directions. Alternatively, if desired, the fins may be retained for hydrodynamic stability if they are mounted below the plane of the propulsion pods, i.e., such that they do not deflect the backwash as propulsion pods 14 and 15 are rotated. This arrangement is quite satisfactory for propulsion pods having a relatively small thrust producing capability, however, for larger units the illustrated arrangement is more satisfactory. Since the arrangement for tilting control of the motor or the fins requires the same mechanical movement about the support, the mechanisms for producing the control movements will be considered together.

A rudder 21 is mounted on the aft end of submarine vessel 11 for lateral control thereof. It will also be observed that a small sonar dome 22 is placed on the underside of submarine vehicle 11. Sonar dome 22 may house a height off bottom sonar transducer for a height off bottom control to be described in connection with control system of submarine vehicle 11.

Assuming submarine vehicle 11 is in close proximity to the bottom and wishes to rise the following control functions are required to cause the vehicle to surface. First, aft fins 18 are placed at approximately 45° angle and propulsion units 15 are started to commence downward depression of the aft end of submarine vehicle 11. Control fin 17 remains in a horizontal position and forward thrust propulsion pod 14 is driven to produce a forward motion which pulls the vessel upwardly. The majority of the aftwardly directed wash from propulsion motor 14 is captured by propulsion pod 15 and therefore the minimal disturbance of bottom sediment is produced. When sufficiently high from the bottom that the backwash from thruster pods 14 and 15 will no longer distrub the sediment. Control fin 18 may be placed in a more nearly horizotnal position and both thruster units may be driven at the desired power to produce both climb and forward propulsion. If it is desired to cause submarine vehicle 11 to dive, control fin 17 is placed so as to deflect the backwash from thruster unit 14 in an upward direction and depress the forward end of submarine vehicle 11 while aft propulsion pod 15 drives the vehicle downwardly and forwardly with control fin 18 in the illustrated central or neutral position.

As previously noted, in vehicles in which the thruster pods 14 and 15 are themselves pivoted for attitude and positional control, fins 17, 18, 19, and 20 may be eliminated. In such a vehicle, it is desired to surface or rise, aft propulsion pod 15 is pivoted so as to direct its thrust in an upward direction and thereby depress the aft end of submarine vehicle 11 while forward propulsion pod 14 drives the vehicle forwardly and upwardly. Likewise, should it be desired to cause submarine vehicle 11 to dive, forward thruster pod 14 is tilted so as to direct its thrust in an upwardly direction, thereby depressing the forward end of submarine vehicle 11. Aft propulsion pod 15 is left to direct its thrust rearwardly and drives the vehicle forwardly and downwardly.

It will be obvious that if reverse motion of submarine vehicle 11 is desired, propulsion pods 14 and 15 may be reversed to be used in conjunction with control fins 19 and 20 or, conversely, in the case of tilting propulsion pods, the pods may be turned to produce the desired motion directly.

Figure 2:
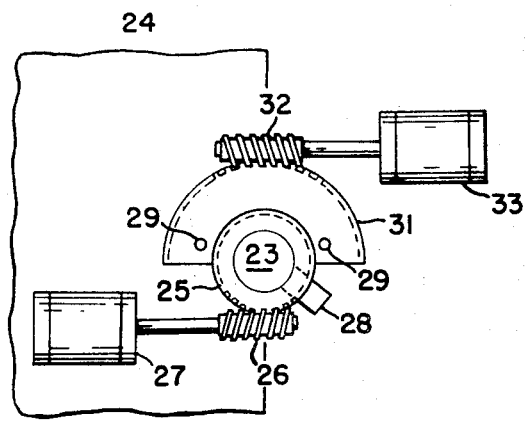
FIG. 2 is a side elevation of the stop mechanism portion of the control means of said submarine vehicle.
Figure 3:
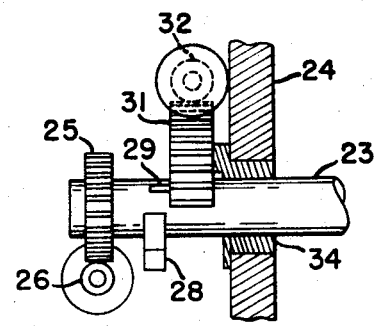
FIG. 3 is an end elevation of the stop mechanism shown in FIG. 2.

Referring to FIGS. 2 and 3, the mechanism to obtain the desired shifting of propulsion pods 14 and 15 is illustrated. As may be seen, a mounting shaft 23 passes through an exterior wall 24 of submarine vessel 11 and has a gear 25 mounted on the inner end thereof. Gear 25 is operatively meshed with a worm gear 26 which in turn is driven by a suitable electric motor 27. An abutment member 28 is carried by shaft 23 and extends radially outwardly therefrom so as to abut stops 29 when the shaft 23 has turned to the appropriate position. Stops 29 may be mechanical stops to physically arrest shaft 23 by means of abutment member 28 or, preferably, they may comprise electrical limit switches which are connected in circuit with motor 27 so as to stop the rotation thereof when contacted by abutment member 28.

In simple low powered instrumentation vehicles, stops 29 may be affixed directly to the hull's exterior wall 24 so as to provide fixed limit of motion for the control mechanism. However, in more sophisticated and larger submarine vehicles, additional control latitude may be obtained by mounting stop members 29 on a driven carrier 31. Driven carrier 31 is seen to be in mesh with a worm gear 32 which, in turn, is driven by a stop motor 33.

Stop motor 33 as well as motor 27 are illustrated in FIG. 2 as electrical motors. However, it should be recognized that other suitable power sources may be employed, if desired. For example, motors 27 and 33 may be replaced by suitable manual operators or they may be tied by suitable transmission means to the propulsion motor within propulsion pod 15 itself.

Driven carrier 31 is in turn supported by a collar 34 which is concentric about shaft 23 and is journaled thereon for rotation so as to move stops 29 circumferentially about shaft 23. It should be noted that motors 27 and 33 have been omitted from FIG. 3 for purposes of clearity. Likewise, the seals which prevent water from gaining access to the interior of submarine vehicle 11 through the shaft journals and collar 34 have also been omitted for purposes of illustrative clearity. However, it should be recognized that any suitable, conventional, state of the art seal may be used for this purpose.

Figure 4:
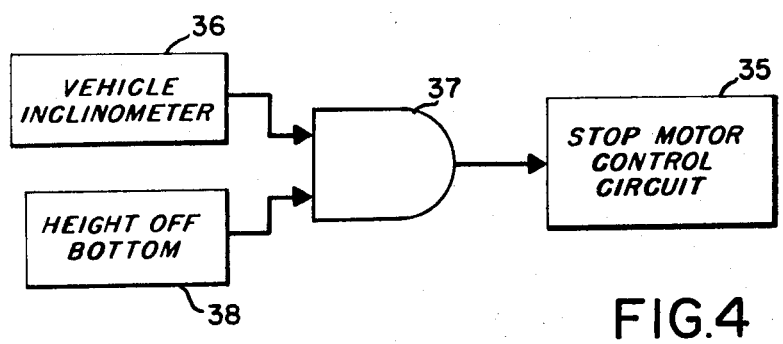
FIG. 4 is a block diagram of suitable control circuitry used with the device of the invention.

Referring to FIG. 4, a simplified control circuit arrangement is shown which positions stops 29 in a desired horizontal plane thereby freeing operators from this task. A suitable stop motor control circuit 35 receives an input from a vehicle inclinometer 36 via an electrically controlled switch 37. Stop motor control circuit may be any suitable bridge type arrangement which causes stop motor 33 to turn driven carrier 31 to a desired position. A variety of such control circuits are common in the art and therefore not illustrated in detail herein. Likewise, a variety of circuits suitable for use as vehicle inclinometer 36 are well known. For example, a pendulum operated resistance bridge is commonly found employed in such applications and may be used in this invention. Electrical switch 37 may be any suitable logic type circuit and connects vehicle inclinometer for effective control of stop motor 36 in response to trigger signals received from a conventional height off bottom sonar 38. Height off bottom sonar 38 may be a general purpose recording instrument commonly carried by such submarine research vehicles and operatively connected to sonar dome 22, shown in FIG. 1.

Of course, the function of height off bottom sonar 38 is to override the vehicle inclinometer control for heights from the bottoms sufficiently high that the backwash from propulsion pods 14 and 15 are no longer a threat to the sediment deposits.

It will be recognized that stops 29 are positioned 180° apart which, as will be well understood, is the appropriate distance for the control of propulsion pods 14 and 15. As previously noted, for the control of fins 17, 18, 19, or 20, an angular spacing slightly in excess of 45° is all that is required. In such instances, motor stop control circuit 35 and vehicle inclinometer 36 are calibrated for the appropriate angular variations.

MODE OF OPERATION

Considering the submarine vehicle 11 is on or near the surface, the following mode of operation will permit the vehicle to approach the bottom at the proper operating depth. The thrust of forward propulsion pod 14 is directed in an upward fashion such as to depress the forward portion of submarine vehicle 11 downwardly and the aft propulsion pods are operated in their forward or undeflected position such as to drive the vehicle forward and downwardly. When the vehicle approaches a working depth in relation to the bottom as may be indicated by height off bottom sonar 38 or visually through either viewing dome 12 or viewing port 13, the forward propulsion pod is redirected to the aft direction so as to propel the vehicle in a forward direction and the rearmost propulsion pod 15 may be directed slightly upward to bring the craft back to horizontal attitude if stabilization fins 17, 18, 19, and 20 do not adequately perform this function in their horizontal position.

For movement along the bottom propulsion pods 14 and 15 are directed to aft and bearing attitude control as obtained by use of rudder 21. In such a configuration submarine vessel 11 operates as conventional prior art devices of this type and, if desired, only one set of propulsion pods either 14 or 15 may be used.

When it is desired to return to the surface, the thrust from rear propulsion pods 15 is directed upwardly and at a relatively low velocity. Likewise, forward propulsion pods 14 are left in their horizontal or neutral position and are started in a slow position such as to gradually depart the bottom without disturbing the sediment and small marine life lying thereon. When sufficiently high off the bottom that the backwash from the thruster pods 14 or 15 no longer present any hazard to the bottom, they may be operated at full throttle or at any particular chosen attitude to drive the vehicle upwardly. If the vehicle is equipped with its control arrangement shown in FIG. 4, propulsion pods may be even turned downwardly when their thrust is no longer a threat to the bottom. This is accomplished by rotation stop control motor 33 such that stops 29 are repositioned to permit the direction of the thrust propulsion pods 14 or 15 in a downward direction.

When operating near the bottom, sometimes the vehicle assumes attitudes such that operation of thruster pods 15 or 14 may disturb sediment lying on the bottom inadvertently. This is due in part to operational personnel becoming oriented to a non-horizontal positon of vehicle 11 and neglecting to note the relative angle between the thruster pods and the fixed horizon. This function is controlled in an automatic mode by the system shown in FIG. 4 such that vehicle inclinometer 36 controls stop control circuit 35 such as to position stop 29 so that the thrust directing means is prevented from impinging the bottom. It should also be obvious that, with a slight complication of circuitry, two height off the bottom sonars at forward and aft ends of vehicle 14 together with a suitable vehicle inclinometer may be used to provide a more elaborate control such as to permit submarine vehicle 11 to follow irregular ocean bottom contours without fear of impinging the bottom with backwash from the thruster pods 14 and 15.

The foregoing description taken together with the appended claims constitute a disclosure such as to enable a person skilled in naval architecture and marine engineering arts and having the benefit of the teachings contained therein to make and use the invention. Further, the structure herein described meets the aforestated objects of the invention, and generally constitutes a meritorious advance in the art unobvious to such workers not having the benefit of the teachings contained herein.

Obviously, many modifications and variations of the present invention are possible in the light of the above teachings, and, it is therefore understood that within the scope of the disclosed inventive concept, the invention may be practiced otherwise than specifically described.

What is claimed is:

1. A propulsion system for an underwater vehicle designed to maneuver in close proximity to the bottom of a body of water and having an enclosed hull with a center of buoyancy located approximately amidship of said hull comprising in combination:

a first pair of thrust producing means mounted on said hull in the horizontal plane of the vehicles and forward of said center of buoyancy, one on either side thereof, for producing a propulsion thrust within the water surrounding said vehicle hull;

a second pair of thrust producing means mounted on said hull in the horizontal plate of the vehicles and aft of said center of buoyancy, one on either side thereof, for producing a propulsive force within the water surrounding said vehicle hull;

control means effectively connected to said hull and cooperatively associated with each thrust producing means of said first and second pair of thrust producing means for selectively directing the propulsive thrust developed thereby through angles away from the bottom of said body of water, and including;

control means to direct the thrust from the thrust producing means to only angles within the upper 180° relative to said horizontal plane of the vehicle;

control means to further restrict the degree of freedom of angle selection in response to the attitude of the vehicle; and additional means to further control the degree of freedom of angle selection in response to the height of the vehicle off the bottom effectively connected to override the attitude control means, whereby selective operation of the first pair and the second pair of thrust producing means and said control means maneuvers the underwater vehicle through any desired degree of freedom in close proximity to the bottom of said body of water without disturbing sediment, particulate matter, and marine life thereon.

2. A propulsion system according to claim 1 in which said first and second pairs of thrust producing means include electric motor driven screws.

3. A propulsion system according to claim 1 in which said first and second pairs of thrust producing means include hydrojets.

4. A propulsion system according to claim 1 in which said control means includes motor driven pivotable fins mounted on said hull and positioned to cooperate with said first and second pairs of thrust producing means.

5. A propulsion system according to claim 1 in which said first and second pairs of thrust producing means are connected to said hull by means of angularly movable mountings effectively connected to said control means for movement thereby.

* * * * *